United States Patent Office 3,538,111
Patented Nov. 3, 1970

3,538,111
1-HYDROXYPROPYL H-INDENO [1,2,3-cd]INDAZOLE
Rene DeRidder, Brussels, Belgium, assignor to Manufacture de Produits Pharmaceutiques, A. Christiaens, S.A. Brussels, Belgium
No Drawing. Filed July 15, 1968, Ser. No. 744,685
Int. Cl. C07d 49/18
U.S. Cl. 260—310                        2 Claims

ABSTRACT OF THE DISCLOSURE

Derivatives of 1H-indeno (1,2,3-cd) indazole, namely compounds of the formula

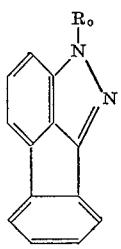

wherein $R_0$ is a mono- or di-hydroxyloweralkyl group are useful as anti-convulsants and anti-tussives.

---

This invention relates to new derivatives of 1H- or 2H-indeno[1,2,3-cd] indazole, to the preparation thereof and to pharmaceutical compositions containing said new compounds.

The main new compounds according to this invention may be represented by the following general formulae

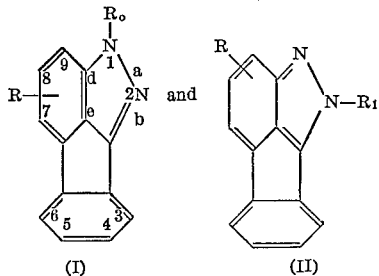

in which R represents hydrogen, chlorine, a nitro, amino or acetylamino group in the 7- or 9-position, $R_0$ represents hydrogen, a lower alkyl, lower alkenyl, lower alkynyl, lower haloalkyl, lower hydroxyalkyl, lower alkoxyalkyl, a acyl, haloacyl or carbamyl group or a a radical of the formula

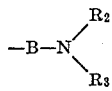

wherein B represents a staright or branched chain of the $(CH_2)_n$ type in which $n=2$, 3 or 4, $R_2$ and $R_3$ which may be identical or different represent hydrogen or a lower alkyl group, and $R_2$ and $R_3$ may also form with the nitrogen atom to which they are attached a nitrogenous heterocyclic ring such as a morpholino, pyrrolidino, piperidino, hevamethyleneimino, piperazino or substituted piperazino radical; $R_0$ may also represent a radical of the formula —D—CO—O—$R_4$ wherein D represents a staright or branched chain of the $(CH_2)_n$ type in which $n=1$, 2, 3 or 4 and $R_4$ represents hydrogen or a lower alkyl group, a radical of the formula

—D—O—CO—$R_5$ wherein D has the above indicated meaning and $R_5$ represents a lower alkyl group; $R_1$ represents a lower alkyl, lower alkenyl, lower haloalkyl, lower hydroxyalkyl, lower alkoxyalkyl group, a radical of the formula

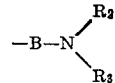

wherein B represents a straight or branched chain of the $(CH_2)_n$ type in which $n=2$, 3 or 4, $R_2$ and $R_3$ which may be identical or different represent hydrogen or a lower alkyl group, and $R_2$ and $R_3$ may also form with the nitrogen atom to which they are attached a nitrogenous heterocyclic ring such as a morpholino, pyrrolidino, piperidino, hexamethyleneimino, piperazine or substituted piperazino radical, $R_1$ may also represent a radical of the formula —D—CO—O—$R_4$ wherein D represents a straight or branched chain of the $(CH_2)_n$ type in which $n=1$, 2, 3 or 4 and $R_4$ represents hydrogen or a lower alkyl group, a radical of the formula —D—O—CO—$R_5$ wherein D has the above indicated meaning and $R_5$ represents a lower alkyl group.

The term "lower," as used herein, indicates an organic group or radical containing 1 to 4 carbon atoms.

This invention also relates to the acid addition salts of the compounds of Formulae I and II wherein R, $R_0$ or $R_1$ represent a nitrogenous group.

The compounds of Formulae I and II are prepared by reacting a compound of the following formula

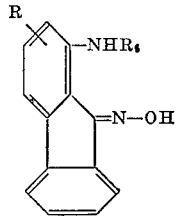

wherein R represents hydrogen, chlorine or a nitro group in the 7- or 9-position and $R_6$ represents hydrogen when R has any of the above meanings, while $R_6$ may also represent a lower alkyl, acyl, haloacyl group when R represents hydrogen and $R_6$ may also represent a haloacyl group when R represents chlorine, with phosphorus pentachloride to obtain a compound of the following formula

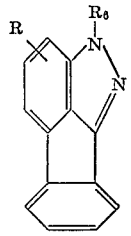

wherein R represents hydrogen, chlorine or a nitro group in the 7- or 9-position and $R_6$ has the above indicated meanings and, if $R_6$ represents a acyl or haloacyl group, hydrolysing the compound of Formula IV to obtain a compound of the following formula

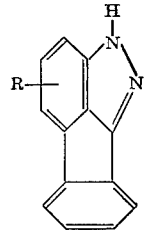

wherein R represents hydrogen, chlorine or a nitro group in the 7- or 9-position and if necessary, either transforming the compound of Formula V into an alkaline metal salt thereof, reacting said alkaline metal salt with a compound of formula X—$R_1$ wherein X represents halogen and $R_1$ has the above indicated meanings so as to obtain a compound of Formula I hereabove wherein R represents hydrogen, chlorine, or a nitro group in the 7- or 9-position, and $R_0$ is other than hydrogen, possibly together with a corresponding isomer of Formula II hereabove and if necessary, separating the isomer compounds of Formulae I and II from one another, or reacting the compound of Formula V with phosgene and ammonia in an anhydrous medium such as anhydrous ether to obtain a compound of Formula I wherein $R_0$ represents a carbamyl group whereby, in either of the above indicated alternatives, a compound of Formula I or Formula II wherein $R_0$ or $R_1$ has the above indicated meanings and R represents a nitro group in the 7- or 9-position is transformed, if desired, by reduction into a compound of Formula I or Formula II wherein $R_0$ or $R_1$, has the above indicated meanings and R represents an amino group in the 7- or 9-position and, if desired, the latter compound is either acetylated to obtain the corresponding compound of Formula I or Formula II wherein R represents an acetylamino group in the 7- or 9-position or transformed into an acid addition salt thereof.

Among the new compounds of Formulae I and II and the acid addition salts of some of them, the following are preferred:

1H-indeno[1,2,3-cd]indazole;
1-benzoyl-1H-indeno[1,2,3-cd]indazole;
1-chloroacetyl-1H-indeno[1,2,3-cd]indazole;
1-acetyl-1H-indeno[1,2,3,-cd]indazole;
1-carbamyl-1H-indeno[1,2,3-cd]indazole;
1-methyl-1H-indeno[1,2,3-cd]indazole;
2-methyl-2H-indeno[1,2,3-cd]indazole;
1-($\beta$-chloroethyl)-1H-indeno[1,2,3-cd]indazole;
1-($\gamma$-chloropropyl)-1H-indeno[1,2,3-cd]indazole;
1-($\gamma$-pyrrolidinopropyl)-1H-indeno[1,2,3-cd]indazole hydrochloride;
1-($\gamma$-piperidinopropyl)-1H-indeno[1,2,3-cd]indazole hydrochloride;
1-($\gamma$-morpholinopropyl)-1H-indeno[1,2,3-cd]indazole hydrochloride;
1-[$\gamma$-(N-methylpiperazinyl)propyl]-1H-indeno[1,2,3-cd]indazole dihydrochloride;
1-($\gamma$-dimethylaminopropyl)-1H-indeno[1,2,3-cd]indazole hydrochloride;
1-($\gamma$-methylaminopropyl)-1H-indeno[1,2,3-cd]indazole hydrochloride;
1-($\gamma$-ethylaminopropyl)-1H-indeno[1,2,3,-cd]indazole hydrochloride;
1-($\beta$-morpholinoethyl)-1H-indeno[1,2,3-cd]indazole hydrochloride;
1-($\beta$-piperidinoethyl)-1H-indeno[1,2,3-cd]indazole hydrochloride;
1-($\beta$-methylpiperazinylethyl)-1H-indeno[1,2,3-cd]indazole dihydrochloride;
1-($\beta$-methylaminoethyl)-1H-indeno[1,2,3-cd]indazole hydrochloride;
1-($\beta$-ethylaminoethyl)-1H-indeno[1,2,3-cd]indazole hydrochloride;
1-($\beta$-dimethylaminoethyl)-1H-indeno[1,2,3-cd]indazole hydrochloride;
2-($\beta$-piperidinoethyl)-2H-indeno[1,2,3-cd]indazole hydrochloride;
1-($\beta$-diethylaminoethyl)-1H-indeno[1,2,3-cd]indazole hydrochloride;
2-($\beta$-diethylaminoethyl)-2H-indeno[1,2,3-cd]indazole dihydrochloride;
1-($\beta$-diisopropylaminoethyl)-1H-indeno[1,2,3-cd]indazole hydrochloride;
2-($\gamma$-dimethylaminopropyl)-2H-indeno[1,2,3-cd]indazole dihydrochloride;
1-($\gamma$-diethylaminopropyl)-1H-indeno[1,2,3-cd]indazole hydrochloride;
Ethyl ester of 1H-indeno[1,2,3-cd]indazole-1-acetic acid;
Ethyl ester of 2H-indeno[1,2,3-cd]indazole-2-acetic acid;
1H-indena[1,2,3-cd]indazole-1-acetic acid;
1-($\beta$-hydroxyethyl)-1H-indeno[1,2,3-cd]indazole;
2-($\beta$-hydroxyethyl)-2H-indeno[1,2,3-cd]indazole;
1-($\beta$-acetoxyethyl-1H-indeno[1,2,3-cd]indazole;
1-($\gamma$-hydroxypropyl)-1H-indeno[1,2,3-cd]indazole;
2-($\gamma$-hydroxypropyl)-2H-indeno[1,2,3-cd]indazole;
1-($\beta,\gamma$-dihydroxypropyl)-1H-indeno[1,2,3-cd]indazole;
2-($\beta,\gamma$-dihydroxypropyl)-2H-indeno[1,2,3-cd]indazole;
1-(methoxymethyl)-1H-indeno[1,2,3-cd]indazole;
2-(methoxymethyl)-2H-indeno[1,2,3-cd]indazole;
1-($\gamma$-propynyl)-1H-indeno[1,2,3-cd]indazole;
7-chloro-1H-indeno[1,2,3-cd]indazole;
1-chloroacetyl-7-chloro-1H-indeno[1,2,3-cd]indazole;
1-($\beta$-chloroethyl)-7-chloro-1H-indeno[1,2,3-cd]indazole;
1-($\beta$-bromoethyl)-7-chloro-1H-indeno[1,2,3-cd]indazole;
1-($\gamma$-chloropropyl)-7-chloro-1H-indeno[1,2,3-cd]indazole;
1-($\gamma$-bromopropyl)-7-chloro-1H-indeno[1,2,3-cd]indazole;
1-methyl-7-chloro-1H-indeno[1,2,3-cd]indazole;
2-methyl-7-chloro-2H-indeno[1,2,3-cd]indazole;
1-($\gamma$-dimethylaminopropyl)-7-chloro-1H-indeno[1,2,3-cd]indazole;
1-($\beta$-piperidinoethyl)-7-chloro-1H-indeno[1,2,3-cd]indazole hydrochloride;
1-($\gamma$-n-butylaminopropyl)-7-chloro-1H-indeno[1,2,3-cd]indazole hydrochloride;
1-(piperidinopropyl)-7-chloro-1H-indeno[1,2,3-cd]indazole hydrochloride;
1-($\gamma$-morpholinopropyl)-7-chloro-1H-indeno[1,2,3-cd]indazole hydrochloride;
1-allyl-7-chloro-1H-indeno[1,2,3-cd]indazole;
1-($\beta$-dimethylaminoethyl)-7-chloro-1H-indeno[1,2,3-cd]indazole hydrochloride;
1-($\beta$-diethylaminoethyl)-7-chloro-1H-indeno[1,2,3-cd]indazole hydrochloride;
2-($\beta$-diethylaminoethyl)-7-chloro-2H-indeno[1,2,3-cd]indazole hydrochloride;
9-chloro-1H-indeno[1,2,3-cd]indazole;
1-chloroacetyl-9-chloro-1H-indeno[1,2,3-cd]indazole;
1-($\gamma$-dimethylaminopropyl)-9-chloro-1H-indeno[1,2,3-cd]indazole hydrochloride;
2-($\gamma$-dimethylaminopropyl)-9-chloro-2H-indeno[1,2,3-cd]indazole hydrochloride;
7-nitro-1H-indeno[1,2,3-cd]indazole;
1-methyl-7-nitro-1H-indeno[1,2,3-cd]indazole;
2-methyl-7-nitro-2H-indeno[1,2,3-cd]indazole;
1-($\gamma$-chloropropyl)-7-nitro-1H-indeno[1,2,3-cd]indazole;
2-($\gamma$-chloropropyl)-7-nitro-2H-indeno[1,2,3-cd]indazole;
1-($\beta$-chloroethyl)-7-nitro-1H-indeno[1,2,3-cd]indazole;
1-($\beta$-dimethylaminoethyl)-7-nitro-1H-indeno[1,2,3-cd]indazole and the hydrochloride thereof;
2-($\beta$-diethylaminoethyl)-7-nitro-2H-indeno[1,2,3-cd]indazole and the hydrochloride thereof;
1-($\beta$-piperidimoethyl)-7-nitro-1H-indeno[1,2,3-cd]indazole and the hydrochloride thereof;
2-($\beta$-diethylaminoethyl)-7-nitro-2H-indeno[1,2,3-cd]indazole hydrochloride;
1-($\gamma$-dimethylaminopropyl)-7-nitro-1H-indeno[1,2,3-cd]indazole hydrochloride;
2-($\gamma$-dimethylaminopropyl)-7-nitro-2H-indeno[1,2,3-cd]indazole and the hydrochloride thereof;
1-($\gamma$-diethylaminopropyl)-7-nitro-1H-indeno[1,2,3-cd]indazole and the hydrochloride thereof;
2-($\gamma$-diethylaminopropyl)-7-nitro-2H-indeno[1,2,3-cd]indazole and the hydrochloride thereof;
1-($\beta$-piperidinoethyl)-7-nitro-1H-indeno[1,2,3-cd]indazole and the hydrochloride thereof;

2-(β-piperidinoethyl)-7-nitro-2H-indeno[1,2,3-cd]
indazole and the hydrochloride thereof;
9-nitro-1H-indeno[1,2,3-cd]indazole;
1-(β-diethylaminoethyl)-9-nitro-1H-indeno[1,2,3-cd]
indazole and the hydrochloride thereof;
2-(β-diethylaminoethyl)-9-nitro-2H-indeno[1,2,3-cd]
indazole and the hydrochloride thereof;
7-amino-1H-indeno[1,2,3-cd]indazole;
7-amino-1-methyl-1H-indeno[1,2,3-cd]indazole and the
hydrochloride thereof;
7-acetylamino-1-methyl-1H-indeno[1,2,3-cd]indazole;
7-amino-2-methyl-2H-indeno[1,2,3-cd]indazole and the
hydrochloride thereof.

Some compounds of Formula III are new and the following new compounds of this formula are preferred:

1-benzoylamino-9-fluorenone oxime;
1-acetylamino-9-fluorenone oxime;
1-methylamino-9-fluorenone oxime;
4-nitro-1-amino-9-fluorenone oxime;
2-nitro-1-amino-9-fluorenone oxime;

1-benzoylamino-9-fluorenone oxime is obtained by reacting 1-amino-9-fluorenone oxime which is a known compound, with benzoylchloride at a pH between 5 and 7, under cooling.

The other new oximes of Formula III cited hereabove are obtained by refluxing the corresponding fluorenone with hydroxylamine hydrochloride in the presence of pyridine with or without using a lower alkanol solvent.

The compounds according to Formulae I and II of this invention may be used in the therapeutical field. It has been found that they are psychotherapeutic agents which may be used as sedatives, relaxants, anticonvulsants, antiparkinson agents, hypnotices, analgesics, anti-tussive agents, anti-inflammatory agents, autonomic nervous system inhibitors and anti-spasmodics. Said compounds have a very low toxicity and some of them exhibit a desirable prolonged action.

The compounds of Formula I in which $R_0$ represents a lower hydroxy- or dihydroxy-alkyl group while R represents hydrogen, particularly the 1- and 2-(β,γ-dihydroxypropyl)-1H-indeno[1,2,3-cd]indazole appear to be promising anti-convulsants, since they are able to prevent supra-maximal electroshock, pentamethylenetetrazole and pentacaine seizures without modification of the normal behavior of the animals (absence of excessive sedation symptoms).

These compounds, particularly the 1-(γ-hydroxypropyl) - 1H-indeno[1,2,3-cd]indazole, have also valuable anti-tussive properties.

Other compounds according to the invention namely compounds of Formula II in which $R_1$ represents a lower alkyl group while A represents an amino group, particularly the 7 - amino-2-methyl-2H-indeno[1,2,3-cd] indazole, appear to have interesting sedative and myorelaxant properties.

Other compounds of Formula I, in which R represents hydrogen and $R_0$ represents a

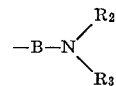

radical wherein B represents a straight or branched chain of the $(CH_2)_n$ type in which $n=2$, 3 or 4, $R_2$ and $R_3$ which may be identical or different represent hydrogen, or a lower alkyl group or may form with the nitrogen atom to which they are attached to a nitrogenous heterocyclic ring, particularly the 1-(β-ethylaminoethyl)-1H-indeno[1,2,3-cd]indazole hydrochloride, have general anti-spasmodic properties, since they inhibit the smooth muscle contraction caused by histamine, cholinergic agents, serotonine, bradykinine, nicotine and barium chloride.

The invention also covers pharmaceutical compositions containing, as active ingredient, at least one compound of the Formula I or II or an acid addition salt thereof together with a pharmaceutically acceptable carrier or vehicle. The compositions are generally intended for peroral, rectal or parenteral administration. Therapeutical compositions to be administered perorally may, for example, be in the form of tablets, dragees or capsules, in which at least one of the novel compounds according to the invention is mixed with a solid, pharmaceutically acceptable vehicle or excipient.

The therapeutical compositions can also be used in the form of liquid preparations for oral administration, especially syrups, elixirs, aqueous dispersions or solutions.

The therapeutical compositions according to the present invention can also be used in the form of solutions to be administered parenterally. Solutions or suspensions for injection purpose can be prepared by using, for example, distilled water or sterile apyrogenic water in which at least one compound of the aforementioned Formula I or II is dissolved or suspended, if desired in the presence of dissolving or stabilizing agent such as propylene glycol.

Finally, it is possible for a compound of Formula I or II to be administered rectally, by incorporating it in a composition for suppositories, for example, in cocoa butter.

The compounds of the general Formulae I and II can be administered in varying doses depending on the particular compound being used, the condition of the patient and the method of administration.

Thus, the compounds in question can be administered perorally or rectally in doses of from 100 to 1000 mg. to be taken three or four times per day. The compounds of the invention are administered parenterally in a single dose of from 50 to 500 mg. per day.

The preparation of some compounds according to formula as well as the use of some of them in the pharmaceutical field will now be described in the following examples.

EXAMPLE 1

Preparation of 1-acetyl-1H-indeno[1,2,3-cd]indazole (a) One prepares first 1 - acetylamino-9-fluorenone oxime by refluxing during a few hours (five hours) the following mixture:

1 g. of 1-acetylaminofluorenone, 1 g. of hydroxylamine hydrochloride, 10 ml. of ethylalcohol, 10 ml. of pyridine.

The solution is thereafter evaporated, and the residue is extracted with water. One obtains a solid which is filtered, washed and recrystallized from benzene. Cream-white microcrystals are obtained, melting at 240–242° C., containing ⅓ of a benzene molecule.

The following mixture is then stirred during 1 hour at room temperature: 2.5 g. of 1-acetylamino-9-fluorenone oxime prepared as described hereabove, 11 g. of $PCl_5$, 120 ml. of dry benzene. The excess of $PCl_5$ is then destroyed by means of ice and the benzene solution is separated, washed, dried and evaporated to dryness. The residue is recrystallized from cyclohexane and yellowish-white microcrystals are obtained with a yield of 50–60%, melting point 117°–118° C.

(b) The following mixture is refluxed during 23 hours: 0.96 g. of 1H-indeno[1,2,3-cd]indazole, 0.5 ml. of acetic anhydride and 20 ml. of anhydrous pyridine. The mixture is then evaporated to dryness and the residue is recrystallized from cyclohexane. One obtains yellowish-white microcrystals, melting point 117°–118° C. The product is identical with the product obtained by cyclization of 1-acetylamino-9-fluorenone oxime as described hereabove in Example 2a.

(c) The same product is obtained, in addition, by reacting, in anhydrous ether, acetyl chloride with the silver salt of 1H-indeno[1,2,3-cd]indazole.

EXAMPLE 2

Preparation of 1-benzoyl-1H-indeno[1,2,3-cd]indazole (a) 1-benzoylamino-9-fluorenone oxime is first prepared as follows:

52.5 g. of 1-amino-9-fluorenone oxime in 500 ml. of dioxane are placed into a 3 necked flask. Thereafter, 32.5 ml. of benzoyl chloride, on the one hand, are introduced dropwise and, on the other hand, a solution of 3 N sodium hydroxide so as to maintain the pH of the suspension between 5 and 7 while cooling by means of a bath of ice. After introduction of the reactants, the mixture is further stirred during 2 hours at ambient temperature and after cooling by means of a mixture of ice and salt, the obtained precipitate is filtered, washed with water, dried and recrystallized from isopropanol. White flakes melting at 244–245° C. or at 219–220° C. (after recrystallization from chloroform) are obtained with a yield of 91%.

Into a suspension of 1.57 g. of 1-benzoylamino-9-fluorenone oxime in 60 ml. of anhydrous toluene, 1.56 g. of phosphorus pentachloride are poured and the mixture is stirred under moisture-free conditions during 2 hours. At the end of that period, ice and aqueous ammonia are added. Thereafter, the toluene layer is separated, washed with water, dried and evaporated to dryness. The residue is recrystallized from cyclohexane and beige crystals melting at 139–140° C. are obtained with a yield of 90%.

(b) 1 - benzoyl - 1H - indeno[1,2,3-cd]indazole is also obtained by stirring the following mixture during 3 hours 30 minutes:

1.92 g. of 1H-indeno[1,2,3-cd]indazole
0.9 ml. of dry pyridine
1.54 g. of benzoyl chloride
40 ml. of dry toluene Water is thereafter added to the above mixture and the toluene layer is washed with water, dried and evaporated to dryness. The residue is recrystallized from cyclohexane and melts at 139–140° C. Yield: 60%.

EXAMPLE 3

Preparation of 1H-indeno[1,2,3-cd]indazole (a) The following mixture is reflux heated during 30 minutes:

225 g. of 1 - benzoyl - 1H - indeno[1,2,3-cd]indazole
107.5 g. of potassium carbonate, 3.4 l. of methyl alcohol,
450 ml. of water.

One third of the solvent is then distilled off and the product is allowed to crystallize. One obtains with a yield of 87% white crystals melting at 199.5°–200.5° C.

This product forms complex compounds with the following substances:

(1) picric acid giving yellow needles (benzene) melting at 181–183° C.
(2) 3,5-dinitrobenzoic acid, giving yellowish-white crystals (isopropyl alcohol) melting at 231–232° C.
(3) 2,4,7-trinitro-9-fluorenone: orange crystals (ethyl acetate) melting at 221–222° C.

The product may be advantageously purified by preparing the complex compound No. 2, purifying the latter by crystallization and regenerating the substance under the action of aqueous ammonia on the complex compound.

(b) The same product may also be obtained as follows: 5.7 g. of $PCl_5$ are poured batchwise at room temperature while stirring into a suspension of 2.56 g. of 1-amino-9-fluorenone oxime in 150 ml. of anhydrous benzene prepared as disclosed in the above cited British patent application No. 27,794/64 and the mixture is stirred during a few hours. Thereafter, crushed ice is added to the mixture and the benzene layer is separated, neutralized, washed and dried. After evaporation of the solvent, the residue is recrystallized from a mixture of benzene and petroleum ether (80–100° C.) and one obtains white microcrystals melting point 199.5° C.–200.5° C.; Yield 60.

(c) The same product is obtained either by contacting 1-amino-9-fluorenone oxime with $PCl_5$ at room temperature and terminating the reaction by heating in a water bath, or by reacting 1-amino-9-fluorenone oxime with $PCl_5$ in benzene or chloroform in the presence of pyridine or by reacting 1-amino-9-fluorenone oxime with $PCl_5$ in $OPCl_3$ used as solvent.

(d) The same product is obtained by hydrolysing 1 - chloroacetyl - 1H - indeno[1,2,3-cd]indazole prepared as in Example 1 or 1 - acetyl - 1H - indeno[1,2,3-cd]indazole prepared according to Example 2. The hydrolysis of the latter compounds is effected in two ways:

(1) said compounds are refluxed during one hour in methyl alcohol in the presence of concentrated hydrochloric acid. The reaction medium is then evaporated to dryness and the residue is purified by recrystallization from trichloroethylene;

(2) the following mixture is refluxed until completely dissolved: 100 ml. of methyl alcohol, 10 ml. of water, 5.5 g. of sodium hydroxide, 11 g. of 1 - chloroacetyl-1H-ideno[1,2,3-cd]indazole After a few minutes, the solution is treated with active carbon, filtered, acidified with a few acetic acid and water is added thereto until persistant clouding. The thus treated mixture is allowed to cool and to crystallize. Yield: 80% of pure product.

EXAMPLE 4

Preparation of 1 - ($\beta$ - hydroxyethyl) - 1H - indeno[1,2,3 - cd]indazole and 2 - ($\beta$ - hydroxyethyl)-2H-ideno[-,2,3-cd]indazole Into a solution of 9.6 g. of 1-H-indeno[1,2,3-cd]indazole in 60 ml. of anhydrous dimethylformamide, 1.15 g. of sodium hydride are poured and thereafter 4.4 g. of $\beta$-chloroethanol. After a few hours of reaction, the mixture is poured onto ice and the obtained precipitate is filtered, washed, dried and chromatographed in a benzene solution on alumina.

Eluating (1) with a mixture of benzene and dichloromethane: allows to separate 4.8 g. (50%) of starting material;
(2) with dichloromethane: allows to separate 1-($\beta$-hydroxyethyl) - 1H - indeno[1,2,3-cd]indazole as yellow crystals melting at 111.8° C. (cyclohexane) with a yield: 27%;
(3) with ethylacetate: allows to separate 2-($\beta$-hydroxyethyl)-2H-indeno[1,2,3-cd]indazole as yellows crystals melting at 172.4° C. (carbon tetrachloride) with a yield of 13%.

EXAMPLE 5

Preparation of 1-($\gamma$-hydroxypropyl)-1H-indeno[1,2,3-cd]indazole and 2-($\gamma$-hydroxypropyl)-2H-indeno[1,2,3-cd]indazole Into a solution of 4.06 g. of 1-H-indeno[1,2,3-cd]indazole in 30 ml. of anhydrous dimethylformamide, 0.5 g. of sodium hydride are poured and then 2.4 g. of 1-chloro-3-propanol. After stirring during 5 hours at 60° C., the solution is poured onto ice and the aqueous phase is extracted by means of dichloromethane.

After evaporation of the solvent, the residue is dissolved into benzene and chromatographed on alumina.

Eluating (1) With dichloromethane: allows to separate 1-($\gamma$-hydroxypropyl) - 1H - indeno[1,2,3-cd]indazole as yellow needles melting at 81° C. (cyclohexane). Yield: 53%.
(2) With ethyl acetate: allows to separate 2-($\gamma$-hydroxypropyl)-2H-indeno[1,2,3-cd]indazole as yellow needles melting at 89.9° C. (cyclohexane). Yield 20%.

EXAMPLE 6

Preparation of 1-(β,γ-dihydroxypropyl)-1H-indeno[1,2,3-cd]indazole and 2-(β,γ-dihydroxypropyl)-2H-indeno[1,2,3-cd]indazole.

Into a solution of 9.6 g. of 1H-indeno-[1,2,3-cd]indazole in 60 ml. of anhydrous dimethylformamide, 1.15 g. of sodium hydride and then 6.07 g of γ-chloro-β,γ-dihydroxy-propane are poured. After stirring during 5 hours at 70° C., the solution is poured onto ice and the obtained precipitate is filtered washed, dried and analyzed in the form of a benzene solution by chromatography on alumina.

Eluating (1) With dichloromethane: allows to separate 27% of starting material;

(2) With ethyl acetate: allows to separate first 1-(β,γ-dihydroxy propyl)1H-indeno[1,2,3-cd]indazole as white crystals (benzene) melting at 142.2° C. Yield: 40%. Thereafter, one finds 2-(β,γ-dihydroxypropyl)-2H-indeno[1,2,3-cr]indazole as pale yellow crystals melting at 167° C. Yield: 30%.

EXAMPLE 7

Tablets

| | Mg. |
|---|---|
| 1-(γ-hydroxypropyl)-1H-indeno[1,2,3-cd]indazole | 100 |
| Starch | 100 |
| Talc | 50 |
| Magnesium stearate | 5 |

EXAMPLE 8

Vials for intramuscular injection 7-amino-2-methyl-2H-indeno[1,2,3-cd]indazole—100 mg.
Buffering phosphate to pH—7.5
Apyrogenic water—1 ml.

EXAMPLE 9

Suppositories

1 - (β-ethylaminoethyl)-1H-indeno[1,2,3-cd]indazole hydrochloride—100 mg.
Cocoa butter q.s.ad—1 suppository The above compositions, and other analogously formulated compositions containing an active compound according to this invention, can be administered, in the treatment of any of the hereinbefore-described disaffections and in the dosage ranges previously set forth, to mammals, i.e. human beings and warm-blooded animals, such as dogs, cattle, horses, etc.

What is claimed is:

1. A member selected from the group of 1-(β,γ-dihydroxypropyl)-1H-indeno[1,2,3-cd]indazole and non-toxic acid addition salts thereof.

2. A member selected from the group of 1-(γ-hydroxypropyl)-1H-indeno[1,2,3-cd]indazole and non-toxic acid addition salts thereof.

No references cited.

ALEX MAZEL, Primary Examiner

J. TOVAR, Assistant Examiner

U.S. Cl. X.R.
260—311; 424—269